United States Patent [19]

Herrmann et al.

[11] Patent Number: 4,722,496
[45] Date of Patent: Feb. 2, 1988

[54] COUPLING MECHANISM FOR QUICK ATTACH/DISCONNECT OF A MISSILE CONTROL

[75] Inventors: Werner E. Herrmann; Albert Malis, both of Northridge, Calif.

[73] Assignee: Hughes Aircraft Company, Los Angeles, Calif.

[21] Appl. No.: 794,866

[22] Filed: Nov. 4, 1985

[51] Int. Cl.$^4$ .............................. F42B 15/02
[52] U.S. Cl. ..................... 244/3.25; 403/16; 403/322; 403/331; 403/381
[58] Field of Search ..................... 244/3.24, 3.25; 403/381, 331, 322, 16

[56] References Cited

U.S. PATENT DOCUMENTS

| | | | |
|---|---|---|---|
| 520,000 | 5/1894 | Hardsocg | 403/381 |
| 2,842,058 | 7/1958 | Kuller et al. | 244/3.24 |
| 3,011,604 | 12/1961 | Littleworth | 189/36 |
| 3,090,086 | 5/1963 | Fata | 403/381 |
| 3,093,075 | 6/1963 | Garrett et al. | 244/3.24 |
| 3,117,520 | 1/1964 | Kerr et al. | 244/3.24 |
| 3,135,203 | 6/1964 | Halsted et al. | 244/3.24 |
| 3,276,377 | 11/1964 | Bell | 244/3.24 |
| 3,648,953 | 3/1972 | Polk | 244/3.24 |
| 4,568,041 | 2/1986 | Whitham | 244/3.24 |

FOREIGN PATENT DOCUMENTS 565071 3/1958 Belgium .
2528131 12/1983 France .
1438932 6/1976 United Kingdom .

Primary Examiner—Deborah L. Kyle
Assistant Examiner—Michael J. Carone
Attorney, Agent, or Firm—C. D. Brown; A. W. Karambelas

[57] ABSTRACT

A coupling mechanism for quick attach/disconnect of a control fin to a missile which does not require the use of a separate tool to make the attachment. A first coupling member 24 is mounted on the control fin actuator rod 16. A force regulating means comprised of a spring 28 and retainer bracket 58 are attached to the first coupling member. A second coupling member 26 and a pivotable lever arm 38 are formed as part of the control fin. When the second coupling member is loosely fitted upon the first coupling member, rotation of the lever arm will engage the force regulating means thereby deflecting the spring 28. The reactive force of the spring is exterted through the lever arm, through the control fin, and causes the second coupling member to firmly and securely engage the first coupling member. A means is provided to lock the lever arm in place so as to retain the first and second coupling members in the firmly engaged position even through extreme aerodynamic maneuvers. The lock is easily disengaged manually should it be necessary to remove a control fin from the missile.

5 Claims, 12 Drawing Figures

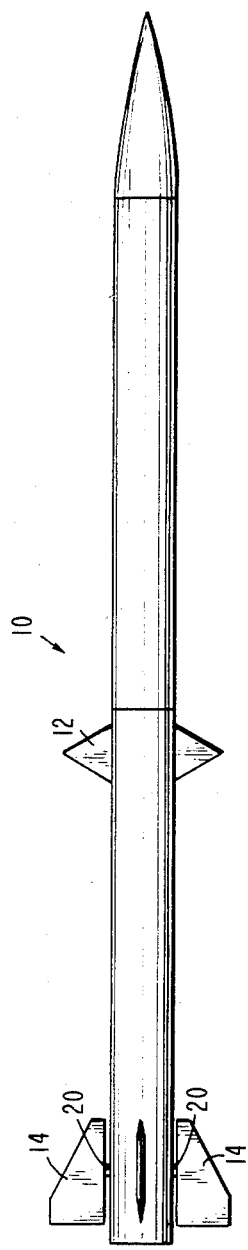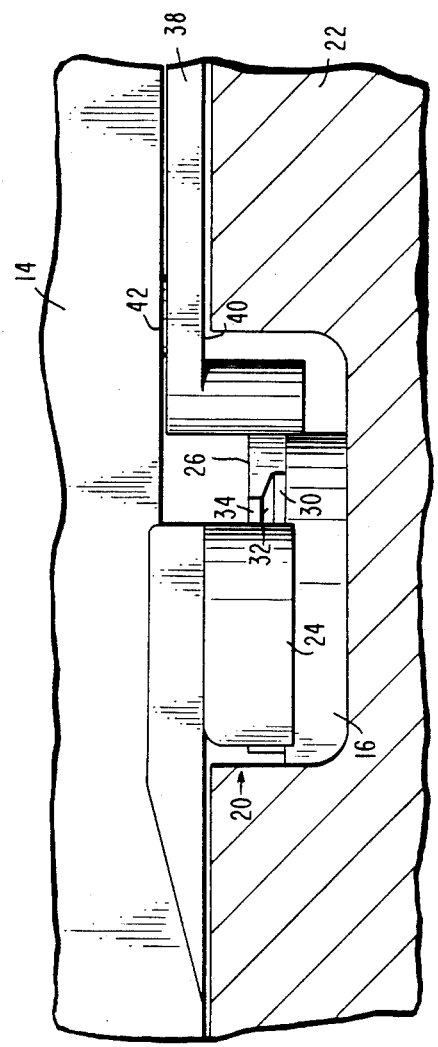

COUPLING MECHANISM FOR QUICK ATTACH/DISCONNECT OF A MISSILE CONTROL

The United States Government has rights in this invention pursuant to government contract F08635-82-C-0001 issued by the U.S. Air Force.

BACKGROUND OF THE INVENTION

1. Field of the Invention

This invention relates to coupling mechanisms and in particular to a device for efficiently and securely coupling a control fin of a missile (or other vehicle) to the control actuator rod for the fin.

2. Related Art

The usual methods used to secure detachable control fins to a missile include the use of screws, pins, bolts, etc. Such devices, in every case known to applicants, require the use of tools to effect the attachment of the fin.

Increasing attention is being paid to the cost of weapons systems. One element of cost of a missile system is the cost of storage and transportation. Costs of storage and transportation can be reduced by reducing the volume occupied by the missile. One way to reduce the volume of a missile is to provide for foldable fins or wings. Foldable fins are not practical for missiles where space is at a premium (i.e., no room to fold fins to the interior of the missile body) or if very high aerodynamic loads are to be applied thus requiring the fins to remain extremely rigidly connected in order to maintain missile aiming accuracy. Another way to reduce the volume of stored missiles is to store the missiles with fins detached. In this case the fins are attached to the missile at the time of loading onto their launchers. For such detached fin missiles, the time required to attach the fins before loading is critical. Loading time must be kept to a minimum to assure rapid availability of the missile for firing. If fins are attached by means of screws, bolts, pins etc., the mechanic attaching the fin must first locate the tool necessary (screwdriver, wrench, hammer etc.,) then operate the tool for the time required to engage the screw, bolt or pin (many rotations or blows).

It can be seen that there is a need for a mechanism, preferably one that does not require the use of a separate tool, for quickly, efficiently and securely attaching a control fin to a missile.

SUMMARY OF THE INVENTION

The invention comprises a uniquely configured detachable control fin and a mounting base together with its associated spring force regulating device which is mounted on the end of the missile's fin actuator rods. Formed as an integral part of the detachable fin is a pivoted lever arm which functions as the "tool" for operating the mechanism of the invention thereby firmly securing (or disengaging) the control fin. A female wedged shaped guide is also formed as part of the fin and, when properly operated, mates with the male wedge shaped track mounted on the end of the control fin actuator rod. As part of the male wedge shaped track there is provided a spring force regulating mechanism. Operation of the lever arm in one direction causes the lever arm to engage the spring force regulating mechanism which thereby provides the regulated amount of force to cause the female wedge shaped guide to engage the male wedge shaped track thereby securely affixing the fin to the actuator rod. Operation of the lever arm in the opposite direction causes the lever arm to engage the body of the missile, which acts as a fulcrum, to urge the female wedge shaped guide in the opposite direction so as to disengage from the male wedge shaped track and release the control fin from the actuator rod. Other features of the invention are described below in the detailed description of the invention.

BRIEF DESCRIPTION OF THE DRAWINGS

FIG. 1 shows a missile and control fins attached thereto by a coupling mechanism.

FIG. 2 is a detailed side view of the coupling mechanism of the present invention.

DETAILED DESCRIPTION OF THE INVENTION

Figure 3:
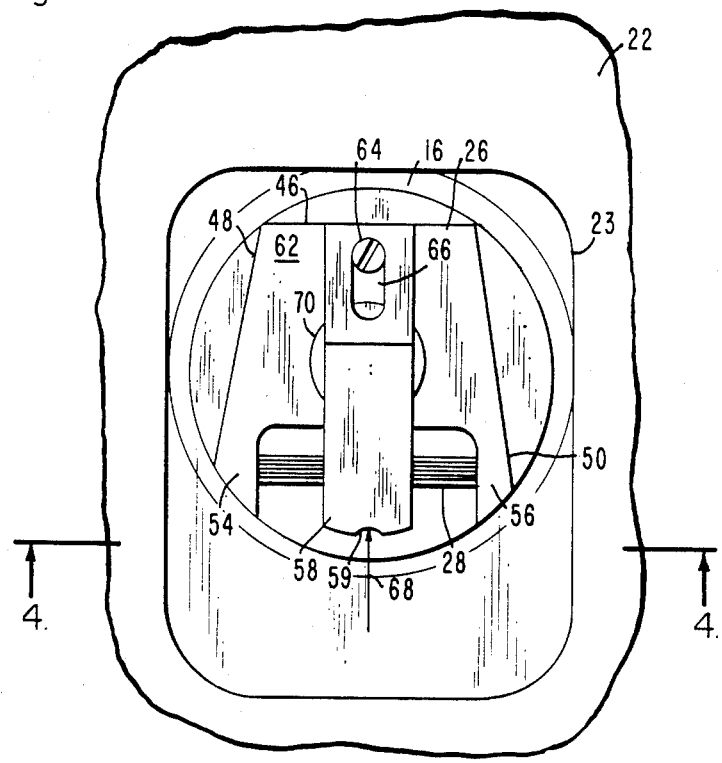
FIG. 3 is a top plan view of the male wedge shaped track and its associated spring force regulating mechanism positioned within a recess in the missile skin.

Illustrated in FIG. 1 is a missile 10 having forward airfoils 12 and a set of four pivotable control fins 14. The direction of flight of the missile 10 is controlled by rotation of the control fins 14 each of which is mounted on the end of a fin actuator rod 16 by a coupling mechanism 20 shown in greater detail in FIG. 2 and in subsequent figures.

A side view of the coupling mechanism 20, with part of the missile body 22 cut away, is shown in FIG. 2. As an integral part of the control fin there is formed a female wedge shaped guide member 24. The male wedge shaped track member 26 is securely mounted on the end of the fin actuator rod 16. When the female wedge shaped guide member 24 is properly placed upon the male wedge shaped track member 26 and moved toward the aft end of the missile 10 (i.e. toward the right hand side of FIG. 2) the wedge shapes engage each other to effect a secure attachement of the control fin 14 to the missile 10.

The amount of force which holds the wedge shaped coupling members 24 and 26 in engagement may be regulated by careful selection of the kind and number of leaf springs 28 (see FIG. 3) as explained in more detail below with reference to the operational description. Those surfaces of the male wedge shaped coupling member 26 which engage with the opposing surfaces of the female wedge shaped coupling member 24 are outwardly facing surfaces 30, 32, 34 and 62. To insure maximum surface engagement and best (secure) attachment, it is obvious that close tolerances must be maintained when forming the male and female wedge shaped track and guide members 26 and 24. It has been found that tolerances are preferably kept in the range of ±0.0005 to ±0.001 inch. To facilitate engagement and disengagement, the contacting surfaces may be coated with a low friction material or lubricant, such as teflon.

The lever arm 38, the forward end of which is shown in FIG. 2, is securely affixed to the control fin 14 at point 40 such as by a screw or bolt 42. The lever arm 38 is pivotable about point 40. The lever arm 38 is the "tool" which is used to operate the coupling mechanism 20 and once affixed to the control fin 14 is not removed. The lever arm 38 remains affixed to the control fin throughout the storage time and flight time of the missile.

Before giving an operational description, the structure of the coupling mechanism will be described with reference to FIGS. 3–9.

The male wedge shaped track member 26 sits on the end of the control fin actuator rod 16 located within recess 23 in the missile body 22. The track-like coupling member 26 has a forward side 46 and two generally longitudinal sides 48 and 50 which converge in the forward direction. The convergence of sides 48 and 50 gives the male track member 26 a somewhat wedged shape. Mounted within a pair of slots 52 located on the inside walls of the two rearwardly projecting arms 54 and 56 of track member 26 is a plurality of springs 28. The number and stiffness of the springs may be selected to produce the desired amount of force for urging the two wedge shaped coupling members 24 and 26 into engagement as described below. The leaf spring must also be highly resilient to avoid permanent deformation under normal operational use. The springs 28 are retained in slots 52 by a retainer bracket 58 shown best in FIG. 5. The retainer bracket is seated within a guide channel 60 provided in surface 62 of the track member 26, and is slideably secured therein by a screw 64 which passes through the elongated slot 66 and is threaded into member 26.

Figure 6:
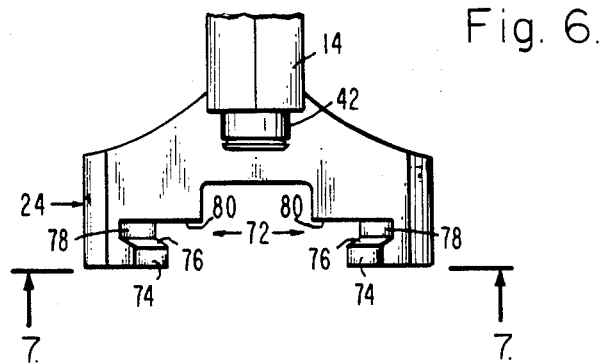
FIG. 6 is an end view of that portion of the fin forming the female wedge shaped guide.
Figure 7:
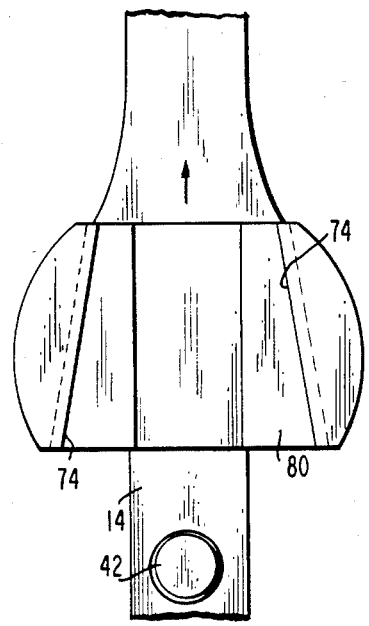
FIG. 7 is the view taken in the direction of the arrows 7—7 of FIG. 6.
Figure 5:
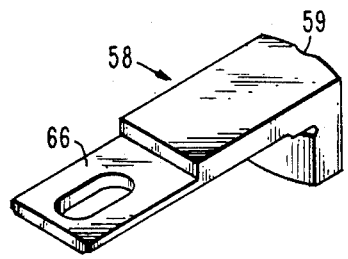
FIG. 5 is a perceptive view of the spring retainer bracket.

A force applied to the aft end of retainer bracket 58, such as indicated in FIG. 3 by arrow 68, tends to flex leaf springs 28 forward allowing the retainer bracket to slide forward in channel 60 such that its forward end extends forwardly of side 46 of the track member 26. Of course leaf springs 28 produce an equal and opposite force tending to slide retainer bracket 58 towards the aft end of the missile. It is this reaction force exerted by the leaf springs which urges the female wedge shaped guide member (as illustrated in FIGS. 6 and 7) into engagement with the male track member 26 thus securing the control fin 14 to the actuator rod 16. Thus the springs and the retainer bracket 58 may together be described as a force regulating means. The male track member 26 and the force regulating means may be secured to the end of the fin actuator rod 16 by a bolt passing through the track member and seated in recess 70 of FIG. 3 or, the track member may be formed as an integral part of the end of the actuator rod 16.

The foregoing describes only that half of the coupling mechanism affixed to the fin actuator rod 16. The other half of the coupling mechanism is integrally formed as part of the control fin and will be described with reference to FIGS. 6 and 7.

In order to show detail and conserve space only the female wedge shaped guide 24 and a small portion of the control fin 14 are shown in FIG. 6. The lever arm 38 (shown in FIG. 9) is not shown in FIG. 6, but as clearly illustrated in FIG. 8 would normally be attached by press fitting the lever arm 38 (at hole 39) over stud 42. The female wedge shaped guide member 26 is formed to provide two guides 72 which converge in the forward direction as shown in FIG. 7. Each guide 72 is comprised of surfaces 74, 76, 78 and 80. When the female guide member 24 is secured upon the male track member 26, outwardly facing surfaces 30, 32, 34 and 62 oppose inwardly facing surfaces 74, 76, 78 and 80 respectively.

Figure 4:
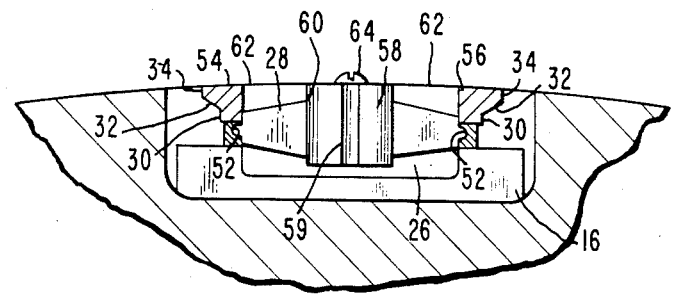
FIG. 4 shows the view when taken along the line 4—4 of FIG. 3.

Special attention is drawn to the fact that opposing surfaces 32 and 76 are not horizontal as shown in FIGS. 4 and 6. Rather, the surfaces are sloped at an angle. This fact produces a second wedging action as the coupling is effected. Since surfaces 32 and 76 slope downwardly toward the centerline of the coupling mechanism a wedging action produced by the movement of surface 76 over surface 32 tends to pull the female wedge shaped coupling member tightly down onto the male coupling member. Specifically surface 80 is drawn into tight engagement with surface 62 at the same time as the female coupling member slides toward the aft end of the missile.

Figure 8:
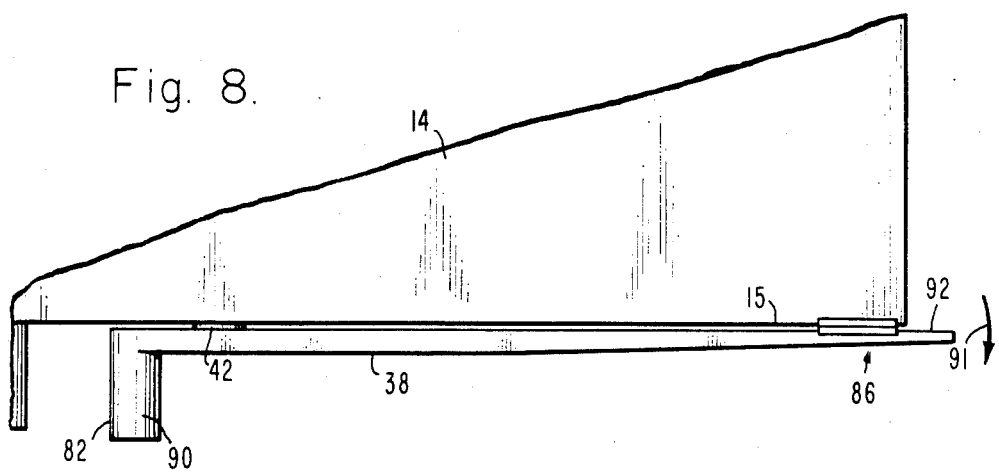
FIG. 8 shows the position of the lever arm mounted to the rear bottom edge of the control fin.
Figure 9:
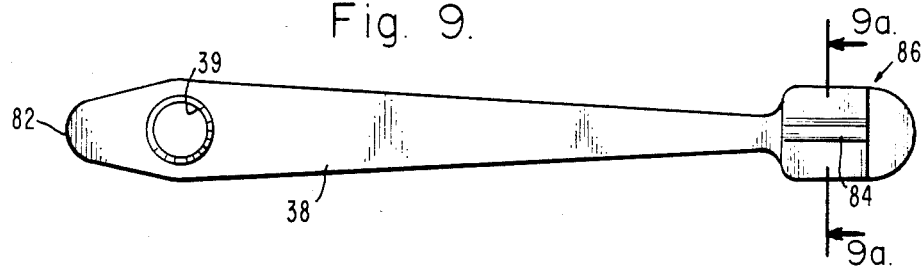
FIG. 9 is a top plan view of the lever arm detached from the fin.
Figure 9A:
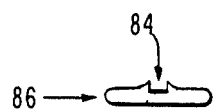
FIG. 9a is a cross-section of the lever arm taken along line 9a—9a of FIG. 9.
Figure 11:
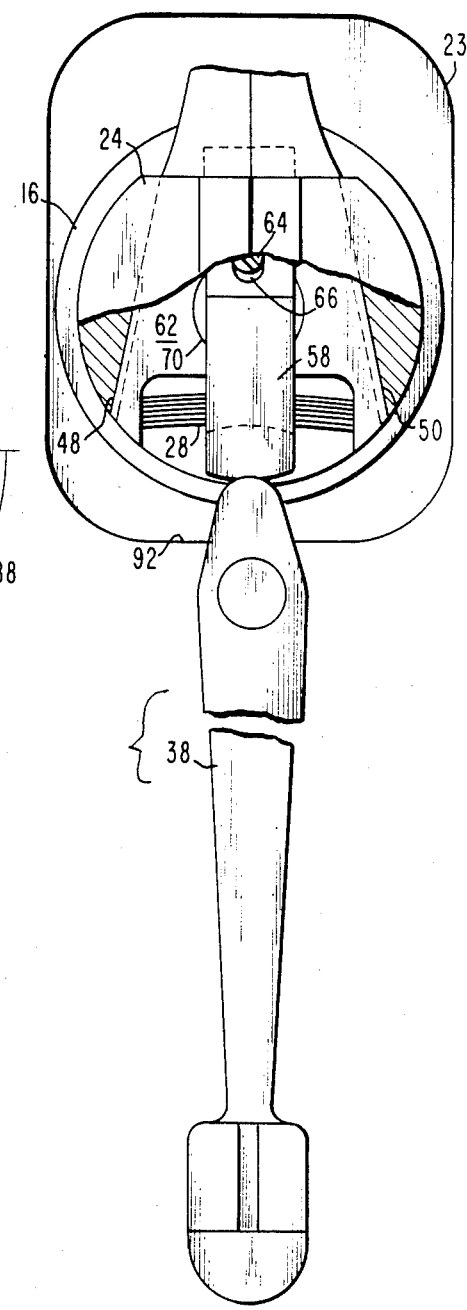

When the control fin 14 is mounted upon and firmly secured to the actuator rod 16, the lever arm 38 is in the position shown in FIGS. 8 and 11. Thus the forward end 82 of lever arm 38 rests in notch 59 of retainer bracket 58 and the lower edge 15 of the control fin rests within slot 84 formed in tab 86 provided on the aft end of lever arm 38. Both notch 59 and slot 84 are provided to ensure that lever arm 38 will not move from its position of longitudinal alignment with the control fin 14 during flight and extreme aerodynamic maneuvers.

Figure 10:
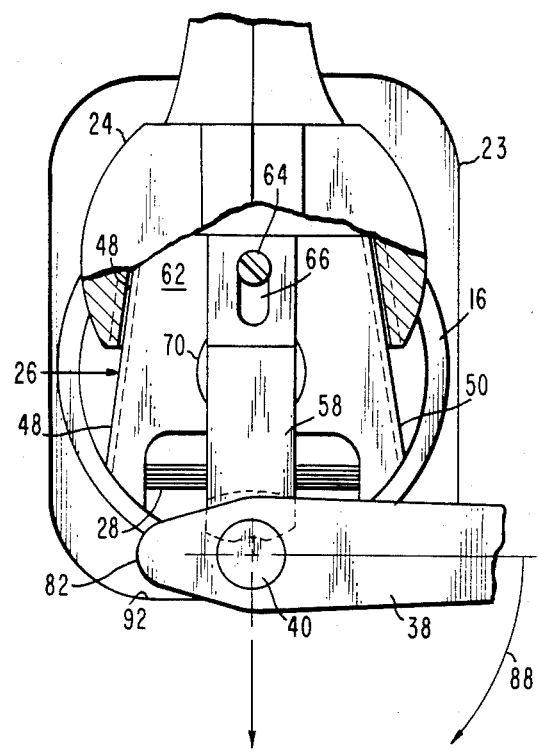
FIGS. 10 and 11 illustrate the operation of the lever arm to disengage and engage the pair of wedge members and thus disengage and engage the control fin from the actuator rod.

Having thus described the structure of the invention, the operation thereof may be readily understood when taken together with the following description and FIGS. 10 and 11.

To install a control fin 14 onto the missile 10, the control fin is removed from its storage container and the lever arm 38 is rotated so that its longitudinal centerline is approximately perpendicular to the longitudinal centerline of the control fin. This position is indicated in FIG. 10. The female guide member 24 is positioned within recess 23 with its wider end over the narrower end of the track member 26 and then manually aligned so that the guide surfaces on the female coupling member loosely mate with the track surfaces on the male coupling member. The female guide member 24 is then manually slid toward the aft end of the missile on the male track member 26 until more complete engagement of surfaces 30, 32, 34 and 62 with surfaces 74, 76, 78 and 80 occurs.

Final and secure engagement is achieved by grasping the lever arm 38 and rotating it in the direction indicated by arrow 88 so that its forward end 82 engages the aft end of bracket 58. Once engagement occurs, further rotation will only occur if there is an increase in the distance between the pivot point 40 of the lever arm and the aft end of bracket 58. The increase in distance is necessary to permit the rounded forward end 82 to proceed along its path. Continued rotation of lever arm 38 causes interference between the aft end of the bracket 58 and the forward end of lever arm 38 which forces the pivot point 40 in the aft direction as required, thereby increasing the distance between the bracket and the pivot point. Since the female guide member is rigidly connected to the pivot point 40 through the control fin 14, the female guide member 24 is also forced in the aft direction thereby increasing the degree and force of engagement between the female guide member 24 and the male track member 26. When the force of this engagement reaches the amount of force required to deflect the springs 28, the force of engagement is determined and limited by the amount of deflection of the leaf springs. The lever arm 38 may then be further rotated to the position shown in FIG. 11. Note that bracket 58 has slid forward in guide channel 60 and leaf springs 28 are deflected. The lever arm longitudinal centerline is aligned with the longitudinal centerline of the control fin 14. The forward end 82 of the lever arm is seated in notch 59 of the retainer bracket 58 and, as shown in FIG. 8 the lower edge 15 at the aft end of control fin 14 is seated in its locked position in slot 84.

Because of the mechanical advantage provided by lever arm 38, the force required to deflect the springs 28 can be many times greater than the force required to be applied manually to rotate the lever arm. Both the reactive force of the springs 28 and the aerodynamic forces applied against the control fin tend to encourage tight and rigid engagement of the female guide member upon the male track member.

During the above described mounting procedure it should be clear that the coupling members are securely engaged by reason of a double wedge action. The first wedge action occurs because each coupling member is provided with a set of longitudinally oriented surfaces (30, 32, 34 and 74, 76, 78) which converge in the forward direction. As the female coupling member moves aft, the wedge action is initiated. The second wedging action also occurs as the female coupling member moves aft, but it is effected by the slope of opposed surfaces 32 and 76. As surface 76 more tightly engages surface 32, surface 76 is forced downward thus drawing surface 80 into tight engagement with surface 62. The double wedging action effects secure longitudinal engagement and secure radial (with respect to the missile centerline) engagement of the fin with the actuator rod.

To disconnect the control fin 14 from the control actuator rod 16, a downward manual force as indicated by arrow 91 (see FIG. 8) is applied to the surface 92 of tab 86 which extends aft of the control fin 14. When the aft end of the lever arm has been deflected sufficiently to allow edge 15 to leave slot 84, then the lever arm is rotated to unseat forward end 82 from notch 59 of bracket 58. At this point the reactive force of springs 28 will assist the rotation of lever arm 38. However, because the force of the springs is selected to be just under that which would cause the guide member to become jammed upon the track member, the members are still firmly engaged to an extent that they would be nearly impossible to disengage manually without assistance. This assistance is provided by the mechanical advantage of the lever arm. Once the forward end 82 is free of notch 59, continued rotation of lever arm 38 will cause the depending arm 90 (as shown in FIG. 8) to contact aft wall 92 of recess 23 formed in the missile body 22. Once such contact is made, further rotation of lever arm 38 will cause the point of contact to function as a fulcrum. The mechanical advantage of the lever arm will then be approximately the length of the lever arm divided by the distance between the point of contact and the pivot point 40. Further rotation of the lever arm past the point where it contacts the wall 92, will cause the pivot point to begin to travel in the forward direction. Since the female guide member is rigidly coupled to the pivot point through the control fin, the female guide member is also caused to move forward thus disengaging from the male track member. Once disengaged, the fin and guide member can be slid further forward, and manually removed from the track member and recess 23.

There has thus been described a unique, simple, efficient and fast operating coupling device for attaching control fins to the body of a missile. No tools are required to operate the mechanism other than the the lever arm which is made to be a permanent part of the control fin. While the invention has been described with respect to the specific embodiment illustrated in FIGS. 1 through 11, it should be understood that the invention is not limited to such embodiment. Many changes, alterations and other embodiments could readily be made by one of ordinary skill in the art without departing from the spirit and scope of the invention as taught. The scope of the invention is intended to be limited only as described in the appended claims.

What is claimed is:

1. A coupling mechanism for attaching a control fin to an actuator rod of a missile, comprising:
   a first coupling member mounted on said actuator rod;
   a second coupling member formed as an integral part of said control fin;
   force regulating means secured to one of said coupling members for regulating the maximum force with which said members may engage one another, said force regulating means comprising:
   i. a leaf spring mounted upon said first coupling member and comprising at least one leaf; and
   ii. a retainer bracket slideably mounted upon said first coupling member, so as to be moveable with deflection of said leaf spring, and retaining said leaf spring upon said first coupling member; and
   force multiplying means, secured to said control fin, for multiplying a force applied thereto and applying said multiplied force to said force regulating means, operation of said force multiplying means being effective to cause the force regulating means to secure engagement of said coupling members.

2. The coupling mechanism of claim 1 wherein:
   said first coupling member comprises a track member having sides which converge toward one end thereof, thereby having a somewhat wedged shape; and
   said second coupling member comprises a guide member having sides which converge toward one end thereof and being sized to fit over and matingly engage the sides of said first coupling member.

3. The coupling mechanism of claim 2 wherein:
   the sides of said first and second coupling members are configured to provide two pairs of opposing surfaces sloping radially inward with respect to the centerline of the missile and sloping toward the longitudinal centerline of said first coupling member so as to provide a wedging action during coupling which draws the fin and second coupling member into tight, radially directed, engagement with said first coupling member.

4. The coupling mechanism according to claim 2 wherein said force multiplying means comprises:
   a lever arm pivotably mounted to said control fin so as to rotate about a point intermediate its ends;

rotation of said lever arm in a first direction causing said lever arm to engage said retainer bracket, resulting in deflection of said leaf spring and secure coupling of said first and second coupling members; and rotation of said lever arm in the opposite direction causing said lever arm to engage the body of said missile whereby said control fin and said second coupling member are disengaged from said first coupling member.

5. The coupling mechanism according to claim 4 wherein one end of said lever arm is provided with a notch for receiving an edge of said control fin and said retainer bracket is provided with a channel for receiving the other end of said lever arm, said notch and channel serving to lock said lever arm in position when its longitudinal centerline is aligned with the longitudinal dimension of said control fin.

* * * * *